US010073724B2

(12) United States Patent
Chakraborty et al.

(10) Patent No.: US 10,073,724 B2
(45) Date of Patent: Sep. 11, 2018

(54) METHOD OF INTUITION GENERATION

(71) Applicants: Rabindra Chakraborty, Johns Creek, GA (US); Jay Kalra, San Jose, CA (US); Anupam Awasthi, Saratoga, CA (US); Amol Awasthi, Dubai (AE)

(72) Inventors: Rabindra Chakraborty, Johns Creek, GA (US); Jay Kalra, San Jose, CA (US); Anupam Awasthi, Saratoga, CA (US); Amol Awasthi, Dubai (AE)

(73) Assignee: SENSLYTICS CORPORATION, San Jose, CA (US)

( * ) Notice: Subject to any disclaimer, the term of this patent is extended or adjusted under 35 U.S.C. 154(b) by 247 days.

(21) Appl. No.: 14/735,975

(22) Filed: Jun. 10, 2015

(65) Prior Publication Data

US 2016/0314403 A1 Oct. 27, 2016

Related U.S. Application Data

(60) Provisional application No. 62/152,742, filed on Apr. 24, 2015.

(51) Int. Cl.
*G06F 11/00* (2006.01)
*H04L 29/08* (2006.01)

(52) U.S. Cl.
CPC .............. *G06F 11/00* (2013.01); *H04L 67/02* (2013.01); *H04L 67/12* (2013.01)

(58) Field of Classification Search
CPC ....... H04L 67/12; H04L 67/02; H04L 67/306; H04L 67/22; H04L 67/26; H04L 69/329; H04L 12/1895; H04L 29/06; H04L 41/0213; H04L 63/10; H04L 67/125; G06F 19/3418; G06F 19/327; G06F 3/0484; G06F 3/0488; G06F 19/322; G06Q 50/22; G06Q 10/06
See application file for complete search history.

(56) References Cited

U.S. PATENT DOCUMENTS

| | | | | |
|---|---|---|---|---|
| 7,505,163 B2 * | 3/2009 | Hart | ................... | H04N 1/00222 358/1.15 |
| 8,201,191 B2 * | 6/2012 | Ladd | ...................... | H04L 63/10 709/229 |
| 8,311,524 B1 * | 11/2012 | Nunally | .................. | H04W 4/21 455/414.1 |
| 8,568,313 B2 * | 10/2013 | Sadhu | .................. | A61B 5/0006 340/539.12 |

(Continued)

*Primary Examiner* — Ninos Donabed
(74) *Attorney, Agent, or Firm* — Womble Bond Dickinson (US) LLP

(57) ABSTRACT

An apparatus and a method are disclosed herein for improving predictive and preventive analytics, event tracking and processing of large combinations of data. In one embodiment, a method comprising, receiving a first data set, the first data set including data from a plurality of sources; applying a first rule set to the first subset; responsive to detecting an emergency as a result of the application of the first rule set, generating an emergency notification; generating an intuition by (a) applying a second rule set to a second subset of the first data set, the second rule set selected from one or more rule sets based on the emergency notification, and (b) selecting a course of action based on a result of the application of the second predefined rule set; and providing the course of action to a user is disclosed.

11 Claims, 10 Drawing Sheets

(56) References Cited

U.S. PATENT DOCUMENTS

| | | | |
|---|---|---|---|
| 8,898,332 B2* | 11/2014 | Ou | G06F 21/554 |
| | | | 229/224 |
| 8,977,886 B2* | 3/2015 | Bauer | H04L 67/1097 |
| | | | 714/4.1 |
| 9,251,696 B2* | 2/2016 | Sloo | G01N 27/02 |
| 2009/0089233 A1* | 4/2009 | Gach | G05B 19/4185 |
| | | | 706/45 |
| 2009/0210495 A1* | 8/2009 | Wolfson | G06F 17/30566 |
| | | | 709/205 |
| 2010/0125662 A1* | 5/2010 | Ou | H04L 63/20 |
| | | | 709/224 |
| 2010/0262665 A1* | 10/2010 | Ouyang | H04L 12/1895 |
| | | | 709/206 |
| 2011/0137982 A1* | 6/2011 | Colvin | H04L 67/12 |
| | | | 709/203 |
| 2013/0191513 A1* | 7/2013 | Kamen | G06Q 10/00 |
| | | | 709/219 |
| 2013/0212422 A1* | 8/2013 | Bauer | H04L 67/1097 |
| | | | 714/4.1 |
| 2014/0040437 A1* | 2/2014 | Mitsuya | H04N 21/4349 |
| | | | 709/219 |
| 2014/0214967 A1* | 7/2014 | Baba | H04N 7/173 |
| | | | 709/205 |
| 2014/0280557 A1* | 9/2014 | Mckinley | H04L 41/0273 |
| | | | 709/204 |

* cited by examiner

METHOD OF INTUITION GENERATION

FIELD OF THE INVENTION

The present invention relates to the field of predictive and preventive analytics, event tracking and processing of combinations of data. In particular, specific embodiments of the disclosure relate to the aggregation of large collections of sensor and contextual-based environmental data, performing processing on the aggregation and generating an improved analytic insight and ensuring regulatory compliance.

BACKGROUND OF THE INVENTION

Today, we are more connected as a society than ever before. Data is continuously being mined and stored from various sources by a plethora of companies and individuals. Data may be, among others, data from any type of sensor, data tracked by companies or data relevant to the public at large. Examples of data affecting the public at large may be traffic data, weather data, stock price data, etc.

Companies often use sensors to track the condition or movement of their equipment, the state of processes and inventory conditions. This may be referred to as an data ecosystem of a company. For example, sensors are used at oil wells to monitor various statistics of machines used in the oil drilling process. Additionally, sensors are used to monitor the storage and transportation of inventory. For example, sensors may be placed at intervals along an oil pipeline to monitor the physical condition of the pipeline and enable detection of issues such as leaks in the pipeline, physical damage to the pipeline and/or other similar emergencies. Sensors may be used to track the amount of oil at any point in the pipeline, the water density in the pipeline, the rate of flow of oil at any point in the pipeline, etc. In addition, sensors may be used to track the temperature of the interior of the pipeline, the exterior of the pipeline or the humidity surrounding the pipeline.

In addition, companies track their inventory and sales at their distribution centers. For example, an oil distribution company will track the amount of oil it sells to each gas station, airport, shipping yard, etc. The company may track the price at which each barrel of oil was sold, the date of the sale, etc. The company may also track its supply chain and distribution processes such that the time and steps taken to refine the oil are known. Furthermore, the location of each transport vessel (e.g., ship or truck) will be tracked throughout the distribution process (e.g., via global positioning system).

Currently, some forms of gathered data have been used to predict future events. For example, weather data, e.g., data relevant to the public at large, is routinely collected and used to predict future weather systems in a given geographic area. For example, data may be collected from thermometers, barometers, windsocks, humidity sensors, air pressure sensors, etc.

Currently, in order to determine the reliability of a piece of equipment, failure testing is done in a lab where identical samples of the piece of equipment are tested for extended hours under possible failure conditions to determine the Mean Time to Failure (MTTF). The statistical measure of the MTTF gives a general idea of the durability of a typical piece of equipment under predefined failure conditions. A second technique is known as Mean Time Between Failure (MTBF). MTBF provides mean time measurements between possible failures. Typically original equipment manufacturers (OEMs) determine the MTTF and MTBF for their equipment.

However, even though all of this data may be collected and stored by various sources, the use of such data in predictive or preventive analytics has thus far been limited. For example, the data used to predict the weather forecast (e.g., data relevant to the public at large) has not been combined with data collected by companies regarding their oil inventory and shipments (e.g., business application data such as the enterprise resource planning (ERP) of the company) along with a leak found in an upstream oil transporting pipeline, wherein the business faces a constraint in fulfilling a demand without violating compliance regulations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
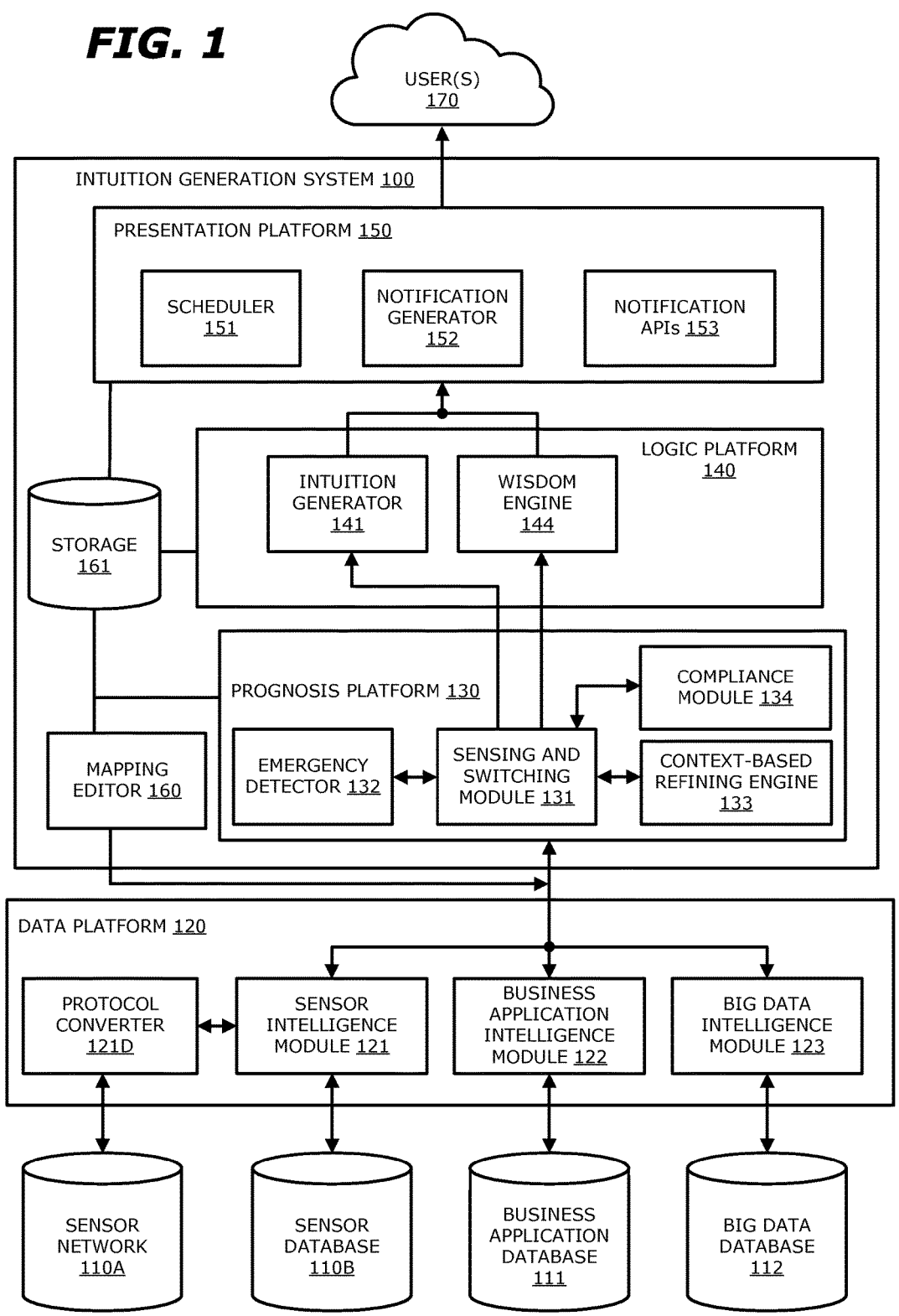
FIG. 1 is a block diagram of an exemplary intuition generation system (IGS) 100 communicatively coupled to a data platform 120 and data sources 110-112.

Methods and apparatuses are disclosed herein for implementing an improved insight and intuition generation process through the use of aggregating multiple data sources for use with predictive analytics and preventive modeling. One goal of an embodiments of the present invention is, using an aggregation of collected data, obtaining improved, reliable and accurate insights, forecasts and recommendations for taking current action regarding, among others, commercial decisions. Using the insights and/or intuition outputs of the intuition generator system (IGS) 100, a course of action pertaining to a business or personal decision may be recommended. The discussion herein uses the oil and gas industry as a primary example. However, the ideas and inventive aspects portrayed in the examples may be applied to other industries (e.g., nuclear energy plants, recycling plants, etc.), commercial ventures or personal motives.

Certain embodiments disclosed herein discuss a device or set of devices, or a system comprising a device or set of devices and a plurality of databases for implementing the invention. Yet other embodiments discuss a series of steps for implementing the invention wherein the steps may include gathering data from a plurality of sensors and/or databases, converting the data into one or more interoperable formats, aggregating one or more portions of the data, applying one or more predefined rules and/or rule sets to the data and selecting a course of action to be presented to a user based on the result of the application of the one or more predefined rules and/or rule sets. The solution can be extended to incorporate fuzzy logic and other kinds of artificial intelligence.

Additionally, certain embodiments provide a solution to problems arising with the Internet of Things (IOT) wherein a plurality of sensors and databases contain a mass amount of data is not currently analyzed in the aggregate so that a course of action may be selected according to the application of one or more rules and/or rule sets to the aggregated data. Specifically, in current technology, certain data, e.g., weather and/or seismic data, may not be aggregated with data obtained through sensors on an oil pipeline. Additionally, the data obtained from the plurality of sensors and databases are retrieved in diverse formats using multiple APIs such that, currently, data from the various sensors and databases is not easily aggregated and interoperable. Therefore, embodiments of the disclosure discuss improving the functioning of an electronic device, e.g., a server or other dedicated hardware device, to include the capabilities for aggregating the gathered data from the plurality of sensors and/or databases by performing the necessary communications protocol and near real time format conversions. Additionally, embodiments of the disclosure discuss improvements to current technology relating to the TOT such that data obtained from a plurality of sensors and/or databases may be made interoperable to be analyzed in the aggregate such that a course of action may be provided to a user that includes a solution to a problem, or imminently occurring problem, while taking into consideration all possible factors.

Furthermore, embodiments of the disclosure discuss steps in a series of generating a recommendation of one or more predefined courses of action by tying a processor's ability to extract or obtain data from a plurality of sources (sensors and/or databases), often located remotely from the electronic device housing the processor(s), with the processor's ability to analyze data in light of one or more predefined rules and/or rule sets enabling the processor(s) to present a selected course or courses of action to a user in accordance with the results of the analysis.

In contrast to MTTF and MTBF, Lead Time to Failure (LTTF) is a completely different concept in predictive analytics. A particular piece of equipment that is deployed interacts with the specific environment in which it operates. The environment in which the particular piece of equipment operates plays a major role in the degradation of the piece of equipment. Embodiments of the disclosure discuss determining LTTF from a current state of one or more particular pieces of equipment under the exact environment and conditions in which the one or more pieces of equipment are operating. In one example, an electric submersible pump (ESP) within an oil rig may degrade at a different rate while operating in the North Sea than while operating in Saudi Arabia. The LTTF may be interpreted as a real time monitoring based prediction technique that provides information the MTTF and MTBF cannot deliver.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

I. Terminology

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The term "big data" should be interpreted as data that affects the general public and should be not interpreted as relating to solely an amount of data. For example, weather data should be interpreted as big data as weather data affects the general public. Examples of weather data include, but are not limited or restricted to, temperature data (e.g., current and projected), rainfall data, humidity data, ultraviolet (UV) index data, wind data, etc.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The term "rule set" may be defined as one or more of the application of a software equation, the application of a binary logic, the performance of one or more curve fitting techniques and/or the application of one or more thresholds.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

I. Intuition Generation System

Techniques for insight, cognition output and intuition generation are described. It is to be understood that the following example(s) is (are) for the purpose of explanation and not limitation. The proposed techniques will be explained in more detail further below with reference to drawings and diagrams.

Referring to FIG. 1, a block diagram of an exemplary intuition generation system (IGS) 100 communicatively coupled to a data platform 120 and data sources 110A/B-112 is shown. As illustrated in FIG. 1, the IGS 100 includes a prognosis platform 130, a logic platform 140, a presentation platform 150 and a mapping editor 160. The prognosis platform 130 includes an emergency detector 132, a sensing and switching module 131 and a context-based refining engine 133; the logic platform 140 includes an intuition generator 141 and a wisdom engine 142; and the presentation platform 150 includes a scheduler 151, a notification generator 152 and notification application program interfaces (APIs) 153. The notification generator 152 may, for example, generate alerts for the one or more users 170 in the form of a user interface (UI), an electronic mail message (email), a text message, or the like. In the embodiment illustrated in FIG. 1, the IGS 100 is communicatively coupled to a data platform 120. However, in a second embodiment, the data platform 120 may be included within the IGS 100. Herein, the data platform 120 includes a sensor intelligence module 121, a business application module 111, a big data intelligence module 123 and a protocol converter 121D. However, in a second embodiment, as illustrated in FIG. 2, the protocol converter 121D may be located within the sensor intelligence module 121.

Finally, the data platform 120 is communicatively coupled to a plurality of databases. In particular, the sensor intelligence module 121 is communicatively coupled to one or more sensors and/or a database storing data obtained from one or more sensors (the sensor network 110A and the sensor database 110B, respectively), the business application intelligence module 122 is communicatively coupled to a business application database 111 and the big data intelligence module 123 is communicatively coupled to a big data database 112.

In one embodiment, (i) the sensor network 110A may include data obtained directly from one or more sensors and the sensor database 110B may include data obtained from databases storing data received from one or more sensors such as Oracle 12c, Mongo DB, Cassandra, or a historian database such as Pi and/or PhD, (ii) the business application database 111 may include data obtained from a rational database management system (RDBMS) such as an Oracle applications database, and (iii) the big data database 112 may include data obtained from publicly or privately available sources such as stock prices, traffic conditions, global positioning system (GPS) locations, weather information, etc. For example, data may be obtained from the U.S. Geological Survey website, which publishes data in real-time using, in one embodiment, a format for encoding geographic data called GeoJSON.

Figure 2:
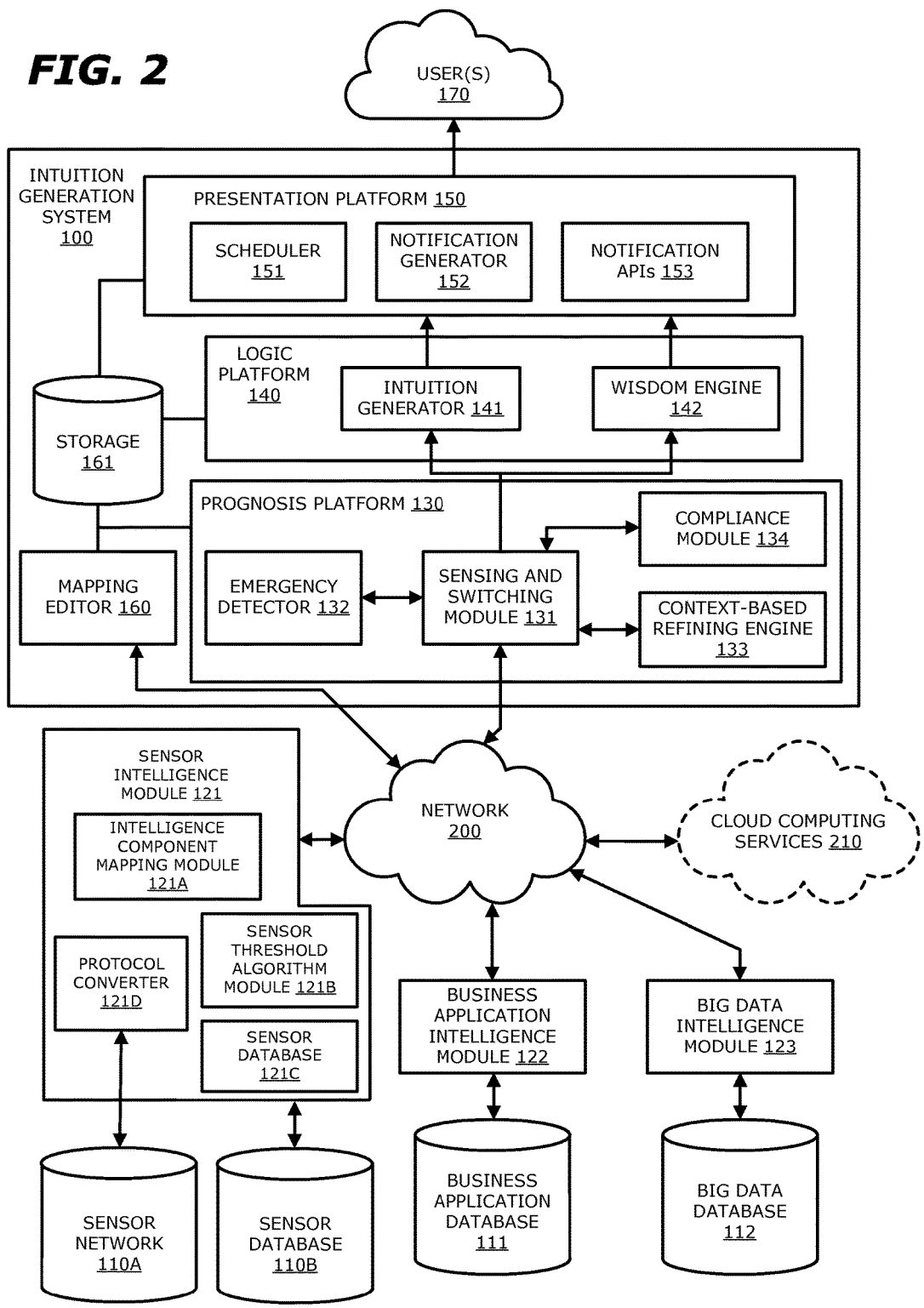
FIG. 2 is a block diagram of an exemplary intuition generation system (IGS) 100 communicatively coupled to the data platform 120 and the data sources 110-112 via a network 200.

Referring to FIG. 2, a block diagram of an exemplary intuition generation system (IGS) 100 coupled to a network 200 is shown. The network 200 provides communication connectivity between the IGS 100 and one or more intelligence modules and through the intelligence modules, various databases communicatively connected to the intelligence modules. In FIG. 2, the one or more intelligence modules, for illustrative purposes, include the sensor intelligence module 121, the business application intelligence module 122 and the big data intelligence module 123. The sensors and/or databases communicatively connected to the sensor intelligence module 121, the business application intelligence module 122 and the big data intelligence module 123 include the sensor network 110A, the sensor database 110B, the business application database 111 and the big data database 112, respectively. In other embodiments, additional or alternative intelligence modules may be connected to the network 200 wherein the additional or alternative intelligence modules are communicatively connected to related databases. In addition, the IGS 100 may be communicatively coupled to the cloud computing services 210 which may provide additional or alternative storage and/or processing hardware.

The IGS 100, as illustrated in FIGS. 1 and 2, may be an electronic network device specially configured for the generation of insights and/or intuitions. Alternatively, the IGS 100 may be software, hardware or firmware acting in coordination with a general purpose electronic device. In yet another embodiment, the IGS 100 may be contained with an individual processor, an embedded microcontroller, a microchip, or the like. In addition, although illustrated as a complete system, the IGS 100 may be comprised of various components such that one or more of the prognosis platform 130, the logic platform 140, the presentation platform 150 and/or the mapping editor 160, or one or more components therein, are located, for example, within the same general purpose electronic device on separate microcontrollers or, alternatively, on the same microcontroller. In addition, although not shown, the IGS 100 may include the storage 161 in order to store, for example, configuration instructions, data provided by one or more of the intelligence modules 121-123, generated insights, generated intuitions, generated UIs, received data, predefined rule sets, etc.

As shown in FIG. 2, the IGS 100 is a system that is adapted to analyze information associated with a plurality of data observed by one or more sensors or stored in one or more databases (e.g., the sensor network 110A, the sensor database 110B, the business application database 111 and/or the big data database 112). In one embodiment, the IGS 100 receives the observed and stored data over the network 200. The network 200 may include a public network such as the Internet, a private network such as a wireless data telecommunication network, wide area network, a type of local area network (LAN), or a combination of networks. Alternatively, the IGS 100 may receive observed data stored in a peripheral storage device.

It has also been envisioned that observed data does not need to be stored in one or more of the sensor database 110B, the business application database 111 and/or the big data database 112 prior to being analyzed by an intelligence module. For example, currently, data collected by sensors monitoring an oil pipeline may be within a private network such as a process control network. In such a situation, the intelligence modules may not directly access the sensor data sitting within the process control network but read the sensor data from a historian database once the data has been transmitted outside of the process control network. However, with proper authentication and APIs, the sensor intelligence module 121 may directly access the sensor data within the process control network as soon as it is collected by the sensors, e.g., through the sensor network 110A.

The sensor network 110A is shown to have a direct connection with the protocol converter 121D. This direct connection may be wired or wireless. The protocol converter 121D obtains data from the sensor network 110A (e.g., one or more sensors pertaining to equipment relevant to the generation of an insight and/or an intuition—e.g., sensors measuring the flow rate of crude oil in an oil pipeline) and converts the data to a format that is readable by the sensor threshold algorithm module 121B and the intelligence component mapping module 121A. Data obtained directly from one or more sensors (e.g., via a push or a pull method) may include of a diverse set of formats. Therefore, the protocol converter 121D includes predefined logic that maps the format of data obtained directly from one or more sensors to a format readable by the sensor threshold algorithm module 121B and the intelligence component mapping module 121A. For example, the protocol converter 121D may convert all data obtained directly from one or more sensors to the format of the data stored in the sensor database 121C (e.g., retrievable by the sensor threshold algorithm module 121B and the intelligence component mapping module 121A using standard SQL instructions). Additionally, the protocol converter 121D may store the data obtained directly from one or more sensors in the sensor database 121C after conversion of the data's format.

The databases communicatively coupled to the intelligence modules store particularized data. For example, the sensor database 110B stores data observed by one or more sensors. For example, an oil pipeline may be comprised of several hundreds of miles of piping to transport crude oil. Within, or connected to, the piping, several sensors gather raw data relating to various particulars of the oil and/or the piping. Examples of such particulars include, but are not limited or restricted to, oil level, flow rate of oil, water density in the piping, and/or the temperature inside and/or surrounding the piping.

In one embodiment, the business application database 111 stores data collected by enterprise databases relating to commercial management and business strategizing (the Enterprise Resource Planning, "ERP," of a corporation). For example, the data collected by enterprise databases of an oil drilling corporation may include, but are not limited or restricted to, the amount of crude oil obtained over predetermined intervals (e.g., days, weeks, etc.), the price at which each gallon of crude oil was sold, the number of transportation vessels currently transporting product to one or more distribution centers, the number of transportation vessels currently idle, the schedule of the amount of product to be delivered to each distribution center, etc. The big data database 112 stores big data affecting the general public. Examples of big data include, but are not limited or restricted to, weather data, airline data (e.g., delays, routes), traffic data, stock prices, etc. In addition, the data stored in the databases 170-172 may be derived from public and/or private data depending on acquired authorization.

Although not illustrated, other embodiments have been envisioned wherein the intelligence modules (the sensor intelligence module 121, the business application intelligence module 122 and the big data intelligence module 123) are located within the cloud computing services 210. In such an embodiment, each intelligence module obtains the appropriate data from one of the databases 170-172 via the network 200 using the appropriate APIs. Additionally, some embodiments have been envisioned in which one or more components of the IGS 100 are contained with the cloud computing services 210. In one such embodiment, the IGS 100 including the prognosis platform 130, the logic platform 140 and the presentation platform 150 are contained within the cloud computing services 210.

FIG. 2 also illustrates that the intelligence modules 121-123 may include specialized logic that interacts with the mapping editor 160 of the IGS 100. Herein, although only the sensor intelligence module 121 is shown to include specialized logic for clarity, the business application intelligence module 122 and the big data intelligence module 123 may also include specialized logic corresponding to the business application database 111 and the big data database 112, respectively. As shown, the sensor intelligence module 121 may include an intelligence component mapping module 121A, a sensor threshold algorithm module 121B and a sensor database 121C. The sensor threshold algorithm module 121B determines whether a significant change (e.g., a change meeting and/or exceeding a predetermined threshold) in the raw data received from the sensor network 110A and/or the sensor database 110B exists since the most recent transmission of data from the sensor intelligence module 121 to the IGS 100. The sensor database 121C within the sensor intelligence module 121 stores the most recent data that was transmitted to the IGS 100. The intelligence component mapping module 121A receives instructions from a mapping editor 160 of the IGS 100. The instructions inform the sensor intelligence module 121 which variables derived from the data derived from the sensor network 110A and/or the sensor database 110B are to be transmitted to the IGS 100 when a significant change exists. As mentioned above, FIG. 2 illustrates an embodiment in which the protocol converter 121D is located within the sensor intelligence module 121. For example, the sensor intelligence module 121 may be a separate hardware device located in a separate physical location from the IGS 100 wherein communication between the IGS 100 and the sensor intelligence module 121 may occur over the network 200.

The intelligence component mapping module 121A filters the raw data obtained from the sensor network 110A and/or the sensor database 110B when the sensor threshold algorithm 121B indicates that a significant change exists between the current data obtained from the sensor network 110A and/or the sensor database 110B and the most-recently transmitted sensor data. The intelligence component mapping module 121A will be configured, and possibly reconfigured, via the instructions of the mapping editor 160 so that only the required variables are transmitted when a significant change exists. In addition, the sensor threshold algorithm module 121B may be preconfigured or configured via instructions from the mapping editor 160 with a list of the required variables to be transmitted to the IGS 100.

Figure 3:
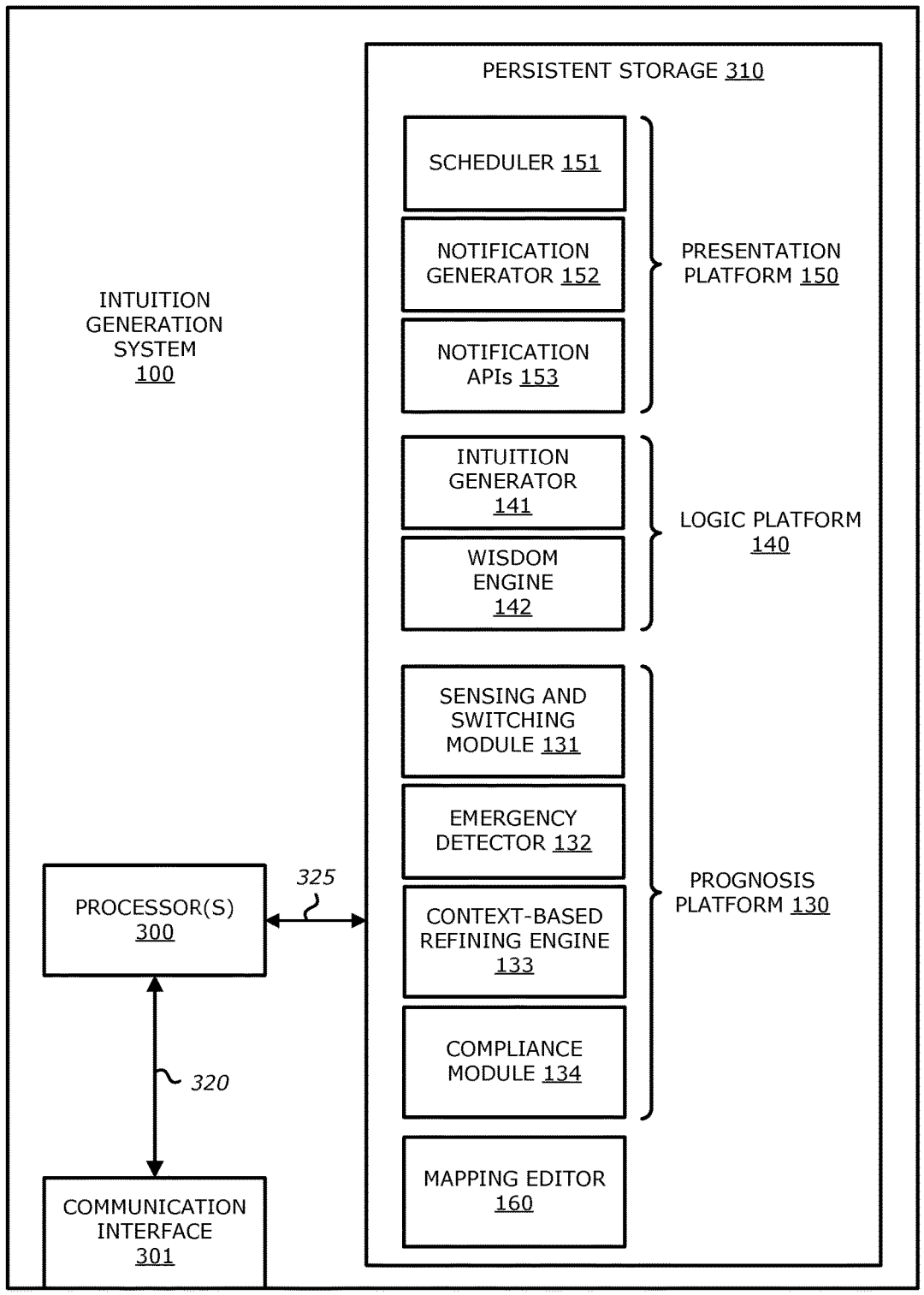
FIG. 3 is an exemplary embodiment of a logical representation of the IGS 100.

Referring to FIG. 3, an exemplary embodiment of a logical representation of the IGS 100 is shown. The IGS 100 includes one or more processors 300 that are coupled to communication interface logic 301 via a first transmission medium 320. Communication interface 301 enables communications with intelligence modules (e.g., the sensor intelligence module 121, the business application intelligence module 122 and/or the big data intelligence module 123) of FIGS. 1 and 2. According to one embodiment, communication interface 301 may be implemented as a physical interface including one or more ports for wired connectors. Additionally, or in the alternative, communication interface logic 301 may be implemented with one or more radio units for supporting wireless communications with other electronic devices.

The processor(s) 300 is further coupled to the persistent storage 310 via a transmission medium 325. According to one embodiment of the disclosure, the persistent storage 310 may include (a) the prognosis platform 130, including the sensing and switching module 131, the emergency detector 132, the context-based refining engine 133 and the compliance module 134; (b) the logic platform 140, including an intuition generator 141 and a wisdom engine 142; and (c) the presentation platform 150, including the scheduler 151, the notification generator 152 and the notification APIs 153. Of course, when implemented as hardware, one or more of these logic units could be implemented separately from each other.

II. Operation During Non-Emergency Situation

Figure 4:
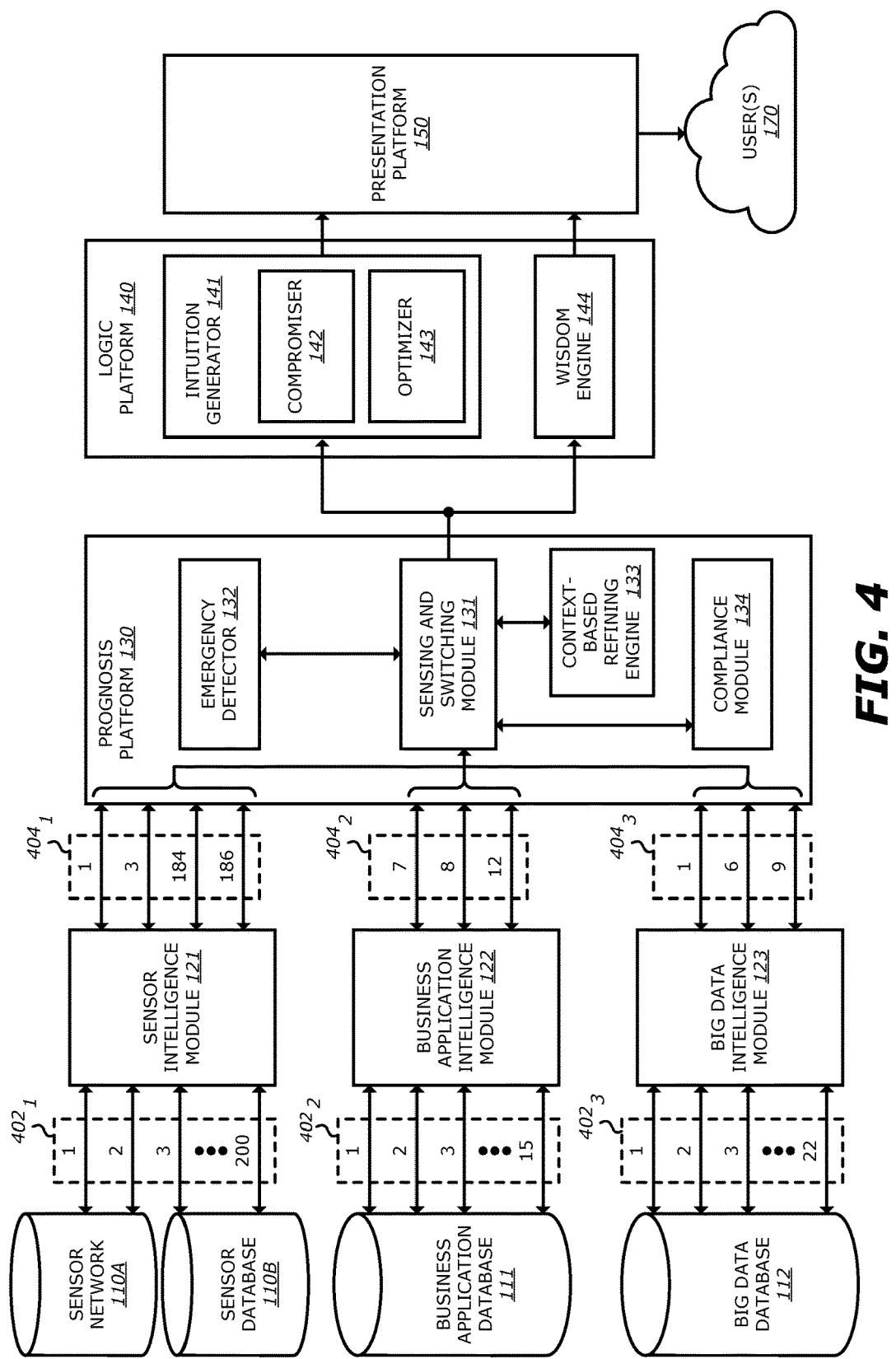
FIG. 4 is a data flow diagram of one embodiment of a data collection and insight and/or intuition generation process.

Referring to FIG. 4, a data flow diagram of one embodiment of a data collection and insight and/or intuition generation process is shown. As described in detail in accordance with FIGS. 1 and 2, the data $402_1$-$402_3$ is transmitted from the sensor network 110A and/or the sensor database 110B, the business application database 111 and the big data database 112 to the sensor intelligence module 121, the business application intelligence module 122 and the big data intelligence module 123, respectively. The illustration as seen in FIG. 4 uses the embodiment as seen in FIG. 2 wherein the protocol converter 121D is located within the sensor intelligence module 121.

The intelligence modules (the sensor intelligence module 121, the business applications intelligence module 122 and the big data intelligence module 123) communicate with the sensor network 110A and the databases 110B-112 via applicable APIs. As discussed above, data received from one or more sensors of the sensor network 110A is processed by the protocol converter 121D prior to being analyzed by the sensor threshold algorithm module 121B. Each intelligence module performs similar activities on the data received from the database to which each is connected.

The sensor intelligence module 121, the business application intelligence module 122 and/or the big data intelligence module 123 filter the received data $402_1$-$402_3$ based on instructions received from the mapping editor 160, as illustrated in FIGS. 1 and 2 (and implemented through an initial configuration and/or a reconfiguration process). One or more portions of the filtered data $404_1$-$404_3$ are subsequently transmitted to the sensing and switching module 131 when one or more of the intelligence modules 121-123 determine a significant change exists between the most recently transmitted data and the data derived from the sensor network 110A, the sensor database 110B, the business applications database 111 and/or the big data database 112.

When in a non-emergency situation (e.g., no notification from the emergency detector 132 has been received by the sensing and switching module 121), the sensing and switching module 131 transmits at least the sensor data to the wisdom engine 144. In some embodiments, along with the sensor data, the sensing and switching module 131 may provide the wisdom engine 144 with one or more variables obtained from the business application database 111 and/or the big data database 112. For example, a maintenance schedule of the oil pipeline may be obtained from the business application data 111 (e.g., via an ERP or MES) may be provided to the wisdom engine 144 according to configuration data. One or more predefined rule sets of the wisdom engine 144 may utilize a maintenance schedule in the generation of an insight.

In one embodiment, an insight may be interpreted as a recommendation for one or more actions to take, or not take, based on an analysis of at least the sensor data. A recommendation may be a predefined course of action that is selected based on the comparison of at least the sensor data to one or more predefined rule sets. In one embodiment, the result of a comparison of one or more portions of at least the sensor data to a rule set may determine the course of action. As discussed below, when one or more rule sets determine multiple courses of action, the courses of action may be ranked by priority (e.g., according to the course of action, the type of emergency, or rule set corresponding to the recommended course of action). Specifically, the insight should be understood as being a transformation of data collected from a plurality of sensors over a predetermined time frame to a concrete recommendation for a course of action based on an analysis of the collected data through the use of one or more rule sets.

Subsequently, the wisdom engine 144 may generate an insight according to the received data. For example, the wisdom engine 144 may receive data including, among other variables, the rate of flow of oil throughout an entire oil pipeline. The wisdom engine 144 may analyze the rate of flow at each sensor along the pipeline and determine an issue exists between two sensors due to a change in the rate of flow of oil exceeding a predetermined threshold. In one example, the rate of flow of oil may decrease from a first sensor to a second sensor more than a predetermined threshold (e.g., a percentage of the rate of flow at the first sensor) indicating that a leak is likely to exist between the first sensor and the second sensor. According to one or more predefined rule sets, the wisdom engine 144 may generate an insight as to a recommendation of an action that should be taken as a result of the leak. In one embodiment, the comparison of the leak (e.g., the percentage of change in the rate of flows) with a predefined rule set may result in the wisdom engine 144 generating an insight asserting that immediate attention needs to be given to the leak. For example, when the leak is above a first threshold, the insight may assert that a maintenance operator be informed of the leak and instructed to schedule maintenance to the pipe. In a second example, when the leak is above a second threshold higher than the first threshold, the insight may assert that a maintenance operator be informed of the leak, that the Board of Trustees of the corporation be informed of the leak, and the U.S. Fish and Wildlife Service be informed of the leak due to the severity and impact the leak may have on the surrounding environment and wildlife.

In one embodiment, in which the maintenance schedule is provided to the wisdom engine 144, the generated insight may recommend merely informing a maintenance operator of the leak but based on scheduled maintenance on the portion of the pipeline containing the leak and the mildness of the leak, immediate maintenance may not be required. Additionally, the wisdom engine 144 may be able to fit the received variables to a linear curve (e.g., using previously received data) and predict that the amount of oil lost due to the leak. This prediction would also be included in the generated insight. In addition to fitting one or more variables to a linear curve, the wisdom engine 144 may include a plurality of algorithms, functions and/or equations such as any linear or nonlinear functions, quadratic equations, trigonometric functions (e.g., sine and cosine), polynomial equations or the like for providing predictions according to predefined rule sets (e.g., the predefined rule sets incorporate one or more algorithms, functions, equations, etc. for utilizing the data received by the wisdom engine 144 to provide an insight to the one or more users 170). Hence, the wisdom engine 144 does not merely consider a single factor, variable, or fitting of data to a single curve. Instead, the wisdom engine 144 utilizes one or more rule sets (selected based on the received data) to analyze the received data in forming an insight.

The wisdom engine 144 may assign a weight to various variables and/or curve fittings. Such weightings may be initially configured as part of the overall configuration of the IGS 100 and the intelligence modules 121-123 (e.g., via the mapping editor), may be reconfigured over time or may evolve based on machine learning and heuristics. For example, the initial configuration of the IGS 100 may instruct the wisdom engine 144 to weigh the one or more variables within the received data more heavily than one or more other variables within the received data. However, over time, the wisdom engine 144, through machine-learning techniques, may alter the weighting of the various variables due to, among other factors, one or more variables routinely providing better fits to curves and/or more or less variation in the data (e.g., more or less outliers based on previously received data). This machine learning process may take place over days, weeks, months and/or years as data is collected. The insight is then provided to the presentation platform 150 which, through the notification generator 152, presents the insight to one or more users 160.

The compliance module 134 receives the data $404_1$ from the sensing and switching module 131 to determine whether the equipment including the one or more sensors supplying the data $402_1$ meet compliance requirements as set forth by various state, national and/or international acts and/or regulations. For example, the United States has enacted several acts that set forth requirements and restrictions relevant to the oil and gas industry. Examples of such acts include the Clean Water Act, the Resource Conservation and Recovery Act, the Oil Pollution Act, the Comprehensive Environmental Response, Compensation and Liability Act and the Federal Clean Air Act. Additionally, international acts and/or treaties may include relevant restrictions or requirements. Any of these acts or treaties may influence corporate policies.

The compliance module 134 may receive the data $404_1$ from the sensing and switching module 131 and apply one or more predefined rule sets to the data $404_1$. Specifically, the predefined rule sets correspond to one or more acts, treaties, laws and/or corporate policies that dictate whether a piece of equipment contributing to the generation of an intuition and/or an insight is in compliance with the acts, treaties, laws and/or corporate policies. For example, a leak in an oil pipeline may be detected and one or more sensors provide measurements enabling the derivation of the amount of crude oil being leaked over a set time interval. Furthering the example, one or more rules and/or rule sets (e.g., stored in the storage 161) may be predefined to correspond to the Clean Water Act such that when a predetermined amount of crude oil is being leaked over a set time interval, the oil pipeline may be found to be non-compliant with the Clean Water Act. Therefore, the compliance module 134, upon applying the one or more rules and/or rule sets corresponding to the Clean Water Act to the data $404_1$ and finding the oil pipeline to be non-compliant, may issue an alert to the one or more users 170 via the logic platform 140 (e.g., as part of an insight and/or an intuition). Furthermore, the one or more rules and/or rule sets may include one or more thresholds such that the one or more users 170 may be alerted to a piece of equipment nearing non-compliance. An alert of near compliance may enable the one or more users 170 to take actions to avoid non-compliance (and hence avoid penalties as a result of non-compliance). Additionally, the compliance module 134 may offer a "compliance as a service" feature such that a compliance alert is generated periodically and/or an API is predefined for extracting compliance data directly from the compliance module 134. For example, a corporation may be interested in receiving continued compliance information (e.g., for reporting or advertising purposes) which may be provided via a periodic compliance alert. In one embodiment, the use of a predefined API may allow a network administrator to extract compliance information directly from the compliance module 134 at preset intervals (via a push or pull method).

Furthermore, the compliance module 134 may determine "near" non-compliance as well. Near non-compliance may be defined as one or more variables of the data 4041 being compliant with the acts, regulations, laws, etc. used in determining compliance by the compliance module 134, but the one or more variables being within a predetermined threshold of non-compliance. For example, if a regulation limits the amount of oil that may be spilled per year and still remain compliant to the regulation, when 90 percent of the amount allowed has been spilled, near non-compliance may be detected.

Additionally, the sensing and switching module 131 transmits at least a subset of the business application data and the big data ("environmental data") to the emergency detector 132. When the emergency detector 132 determines no "emergency situation" presently occurring and no emergency situation is imminent, the IGS 100 provides the generated insight to the presentation platform 150 which in turn provides the insight to one or more users 170 via a generated UI.

III. Detection of and Operation During Emergency Situation

Still referring to FIG. 4, prior to the detection of an emergency, the sensing and switching module 131 may aggregate one or more portions of the business application data and the big data (herein after the aggregation may be referred to as "environmental data"). Subsequently, the sensing and switching module 131 may transmit at least a subset of the environmental data to the emergency detector 132. The emergency detector 132 analyzes the received environmental data to determine whether an "emergency situation" is presently occurring or is imminent based on the application of one or more predefined rule sets.

In one embodiment, a plurality of emergency situations may be predefined through one or more rule sets. For example, an emergency based on severe weather may be defined through a rule set stored in the emergency detector 132. The rule set may comprise a plurality of rules setting forth actions to take according to whether the value of particular variables meets or exceeds corresponding predetermined thresholds. In one example, an emergency may be detected when one or more thresholds are met and/or exceeded for one or more weather data variables (e.g., big data) such as snow accumulation within a predefined radius of an oil pipeline, temperatures within a predefined radius of the oil pipeline, the speed and direction of one or more jet streams, etc. In such an example, the emergency detector 132 compares the received environmental data, including the above-recited weather data variables, to predetermined thresholds corresponding to particular variables. According to a rule set for severe weather, when one or more thresholds are met or exceeded, the emergency detector 132 generates a notification identifying the severe weather emergency. In one embodiment, each variable may be weighted (e.g., assigned a score) and depending on whether the cumulative weight of the variables exceeding corresponding predefined thresholds is above a particular score, e.g. 70 out of 100, the emergency detector 132 may detect an emergency situation is presently occurring or is imminent.

The notification generated by the emergency detector 132 is provided to the sensing and switching module 131. In one example, a generated notification may include (a) the type of emergency detected, as determined by use of one or more predefined rule sets and (b) the one or more particular variables of the environmental data that met or exceeded a threshold triggering the detection of an emergency. The sensing and switching module 131 provides (i) the context-based refining engine 133 with the notification and (ii) the intuition generator 141 with the notification and one or more portions of the environmental data.

Based on the notification, the context-based refining engine 133 may obtain particularized data from one or more of the business application database 111 and/or the big data database 112 through one or more preconfigured queries. The one or more preconfigured queries used by the context-based refining engine 133 may be selected as a result of the type of emergency detected, and/or one or more variables set forth in the notification. In one embodiment, the context-based refining engine 133 may be configured such that a first emergency type indicated in a notification generated by the emergency detector 132 triggers the use of one or more preconfigured queries.

For example, when a severe weather emergency is detected and set forth in the notification, one or more predefined rules may be selected by the context-based refining engine 133. The one or more selected rule sets may set forth one or more preconfigured queries for querying the big data database 112 for weather data (e.g., current snow accumulation, predicted snow accumulation over a predefined time frame, current humidity levels, current wind speed, current temperature, etc.) within, for example, a 50 miles radius of a location on the oil pipeline the severe weather is expected to hit. According to the example, the notification would provide the point at which the severe weather is expected to hit (e.g., geographic coordinates). The one or more selected rule sets may define the radius for the which the weather data will be obtained and, in one embodiment, an increase in frequency at which to query the big data database. In other words, the one or more selected rule sets may set forth an increase in frequency for obtaining weather data near the location at which the severe weather is expected to hit in order to provide the intuition generator 141 with the most current data.

Upon obtaining the particularized environmental data, the context-based refining module 133 provides the particularized environmental data to the intuition generator 141 via the sensing and switching module 131. The intuition generator 141 generates an intuition based on at least one or more of the environmental data provided by the sensing and switching module 131, the notification generated by the emergency detector 132, and/or the particularized environmental data obtained by the context-based refining engine 133 as explained below.

Subsequently, the intuition generator 141 may generate an intuition based on an analysis of one or more of the received environmental data, the notification generated by the emergency detector 132 and/or the particularized data received from the context-based refining engine 133 ("received data"). For example, the received data may include, among other variables, the snow accumulation along an oil pipeline, the predicted snow accumulation along the pipeline for a predefined period in the future, the temperature along the pipeline and seismic data for geographic areas within a predetermined radius of the pipeline. The intuition generator 141 may analyze the snow accumulation along an oil pipeline, the predicted snow accumulation along the pipeline for a predefined period in the future, the temperature along the pipeline and received seismic data according to one or more predefined rule sets. Based on the notification generated by the emergency detector 132, a severe snowstorm may have been detected and details of such set forth in the notification. Herein, the severe snowstorm may have been detected as a result of one or more variables analyzed by the emergency detector 132 exceeding a predefined threshold corresponding to the variable (e.g., the snow accumulation at a particular geographic location on the pipeline exceeds a threshold).

The intuition generator 141 may use one or more predefined rule sets to analyze the received data. For example, according to one predefined rule set, the combination of the data set forth in received seismic data (e.g., indicating an earthquake having a magnitude above a predefined value occurred with a predefined radius of the pipeline) as well as the snow accumulation and predicted snow accumulation may result in the generation of an intuition asserting that a maintenance operator should be alerted to the current or anticipated snow accumulation and seismic information. In such an example, the intuition, as a result of the analysis based on the rule set, may further assert that there is a high likelihood that an earthquake of a similar magnitude as that detailed in the received data would rupture the pipeline and that the possible snow accumulation in that geographic area would make maintenance nearly impossible. Therefore, the intuition could further assert that crude oil flowing through the portion of the pipeline at the designated geographic location should be blocked and/or redirected. For example, the rule set may include a plurality of predefined thresholds to determine at what level of snow accumulation such an assertion should be made in the intuition.

Additionally, the intuition generator 141 may fit the variables of the received data to a linear curve (e.g., using previously received data) and predict that the amount of oil lost due to a rupture of the pipeline. This prediction would also be included in the generated intuition. In addition to fitting one or more variables to a linear curve, the intuition generator 141 may include a plurality of algorithms, functions and/or equations such as any linear or nonlinear functions, quadratic equations, trigonometric functions (e.g., sine and cosine), polynomial equations or the like for providing predictions according to predefined rule sets (e.g., the predefined rule sets incorporate one or more algorithms, functions, equations, etc. for utilizing the data received by the intuition generator 141 to provide an intuition to the one or more users 170). Hence, the intuition generator 141 does not merely consider a single factor, variable, or fitting of data to a single curve. Instead, the intuition generator 141 utilizes one or more rule sets (selected based on the received data) to analyze the received data in forming an intuition.

The intuition generator 141 may assign a weight to various variables and/or curve fittings. Such weightings may be initially configured as part of the overall configuration of the IGS 100 and the intelligence modules 121-123 (e.g., via the mapping editor), may be reconfigured over time or may evolve based on machine learning and heuristics. For example, the initial configuration of the IGS 100 may instruct the intuition generator 141 to weigh the one or more variables within the received data more heavily than one or more other variables within the received data. However, over time, the intuition generator 141, through machine-learning techniques, may alter the weighting of the various variables due to, among other factors, one or more variables routinely providing better fits to curves and/or more or less variation in the data (e.g., more or less outliers based on previously received data). This machine learning process may take place over days, weeks, months and/or years as data is collected.

As illustrated in FIG. 4, the intuition generator 141 may include a compromiser 142 and an optimizer 143. The compromiser 142 may include one or more predefined rule sets specific to determining a recommendation in an emergency situation that minimizes damage. For example, when an emergency included a severe snowstorm is imminent near a particular portion of an pipeline, the compromiser 142 may include one or more rule sets that pertain to handling severe snowstorm emergencies wherein the one or more rules sets are selected by the intuition generator 141 based on the emergency type. The optimizer 143 may include one or more rule sets for ranking the priority of various recommendation to be provided in an intuition.

Upon generation of an intuition, the intuition generator 141 provides the intuition to the presentation platform 150. Specifically, the notification generator 152 receives the generated insight and generates a user interface (UI) that is presented to one or more users 170. The generated UI may be provided to the one or more users 170 at predetermined time intervals stored in the scheduler 151. Additionally, the notification APIs 153 may be used by the notification generator 152 to provide the generated UI to a plurality interfaces. For example, the notification generator 152 may utilize the notification APIs 153 to generate UIs for an Apple® iPad, a Google® Nexus tablet, a Blackberry® Passport mobile device, wherein each device includes a different operating system requiring a unique API.

IV. Example Flows of Operations of the Intuition Generation System

Figure 5:
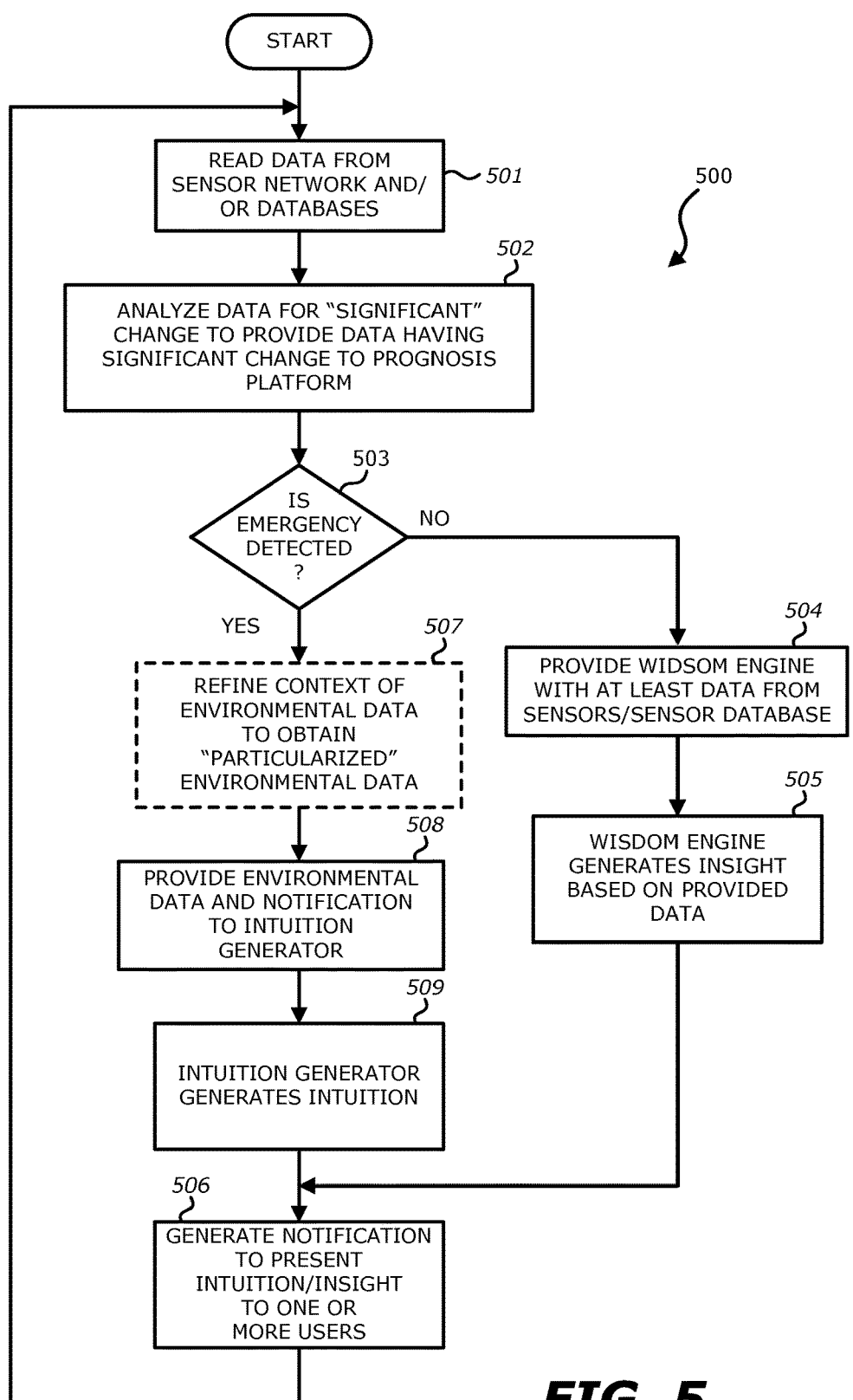
FIG. 5 is a flowchart of an exemplary data collection and insight and/or intuition generation process.

Referring to FIG. 5, a flowchart of an exemplary data collection and insight and/or intuition generation process is shown. Each block illustrated in FIG. 5 represents an operation performed in the method 500 of generating an insight and/or an intuition based on the use of IGS 100 of FIG. 1 is shown. At block 501, data is read from the one or more of the sensor network 110A, the sensor database 110B, the business application database 111 and/or the big data database 112. As illustrated in FIGS. 1 and 2, the data may by read, e.g., via one or more queries, from one or more of the databases using one or more of the corresponding intelligence modules, the sensor intelligence module 121, the business application module 122 and/or the big data intelligence module 123. In one embodiment, the one or more intelligence modules query the corresponding databases at predetermined time intervals (e.g., a pull method). Alternatively, each of the sensor network 110A, the sensor database 110B, the business application database 111 and/or the big data database 112 may transmit data (e.g., predetermined variables) at predetermined intervals (e.g., a push method).

At block 502, the sensor intelligence module 121, the business application module 122 and/or the big data intelligence module 123 analyze the data obtained from one or more of the sensors and/or databases at block 501. The analysis as block 502 determines whether a significant change in the obtained data, as discussed above, exists to warrant providing the data to the prognosis platform 130.

At block 503, the switching and sensing module 131 determines whether an emergency has been detected. As discussed above, the emergency detector 132 analyzes at least a subset of the environmental data (e.g., not sensor data) to determine whether an emergency situation is occurring or whether an emergency situation is imminent. The emergency detector 132 notifies the sensing and switching module 131 when an emergency is occurring or is imminent. The sensing and switching module 131 is configured to transmit, at least, the data obtained from the sensor network 110A and/or the sensor database 110B to the wisdom engine 144 when the emergency detector 132 has not notified the wisdom engine 144 that an emergency is occurring and/or is imminent (no at block 503).

When an emergency has not been detected (no at block 503), the sensing and switching module 131 provides the wisdom engine 144 with data from, at least, the sensor network 110A and/or the sensor database 110B (block 504). The sensing and switching module 131 may also provide data from the business application database 111 and/or the big data database 112 to the wisdom engine 144. For example, the wisdom engine 144 may receive data including sensor data as well as data obtained from one or more of the business application database 11 and/or the big data database 112. In one embodiment, the sensor database 110B may include data derived from a Laboratory Information Management System (LIMS) and/or a Manufacturing Execution System (MES). At block 505, the wisdom engine 144 analyzes the data provided by the sensing and switching module 131 in order to generate an insight.

Subsequently, at block 506, the generated insight is provided to the presentation platform 150. Specifically, the notification generator 152 receives the generated insight and may generate a UI that is presented to one or more users 170. The generated UI may be provided to the one or more users 170 at predetermined time intervals stored in the scheduler 151. Additionally, the notification APIs 153 may be used by the notification generator 152 to provide the generated UI to a plurality interfaces, as discussed above. Upon presenting the UI to the one or more users 170, the method 500 returns to block 501 wherein data is read from one or more of the sensors and/or databases.

When an emergency has been detected (yes at block 503), the context-based refining engine 133 optionally refines the context of the environmental data that is provided to the intuition generator 141 (block 507, optionally represented by the dotted lines). The amount of data comprising the environmental data may be incredibly large and include a lot of environmental data not relevant to the emergency. For example, when an emergency with an oil pipeline is detected, e.g., a severe snowstorm or a potential earthquake, environmental data regarding most of the pipeline is not relevant to the generation of the intuition. Instead, the context-based refining engine 133 may obtain weather data for a specific stretch of the pipeline (e.g., a 30 mile radius of a center of the severe snowstorm) at an increased frequency (e.g., the context-based refining engine 133 may query the big data database 112, which includes weather data, at predefined time intervals) using specialized queries.

As discussed above, the context-based refining engine 132 may be comprised of one or more predetermined rule sets wherein, for example, the specialized queries are predefined, or the specialized queries may include variables that are replaced, by the context-based refining engine 133, with information included in the notification from the emergency detector 132.

At block 508, the environmental data (including the particularized environmental data obtained by the context-based refining engine 133) and the notification generated by the emergency detector 132 are provided to the intuition generator 141. At block 509, the intuition generator generates an intuition based on the environmental data and/or the notification generated by the emergency detector 132. At block 506, the generated intuition is provided to the presentation platform 150, wherein the notification generator 152 generates a UI that is presented to one or more users 170, as discussed above.

Figure 6:
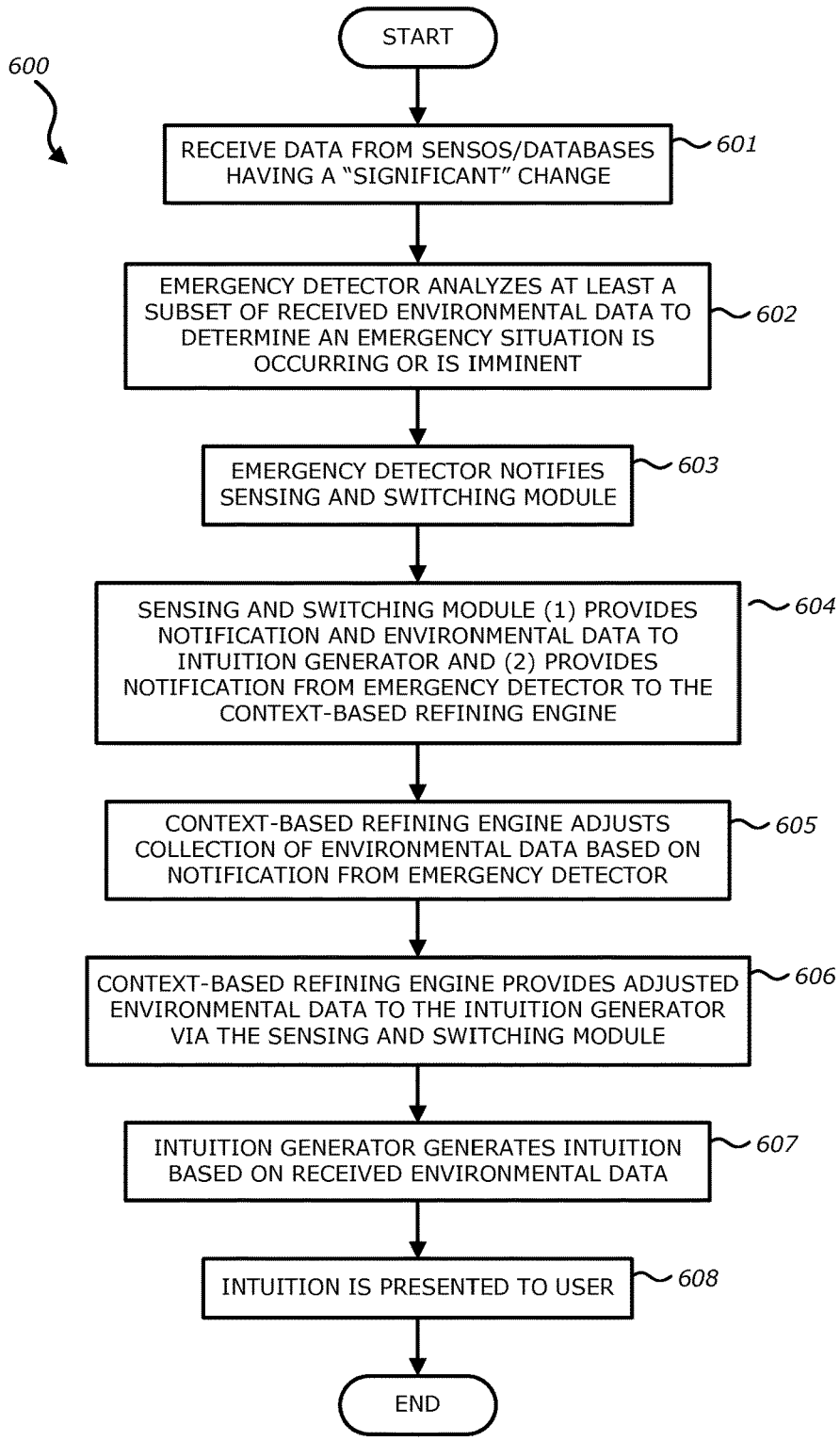
FIG. 6 is a second flowchart of an exemplary process for detecting an emergency and utilizing the intuition engine 141 of the IGS 100 to generate an intuition.

Referring to FIG. 6, a second flowchart of an exemplary process for detecting an emergency and utilizing the intuition engine 141 of the IGS 100 to generate an intuition is shown. Each block illustrated in FIG. 6 represents an operation performed in the method 600 of generating an insight and/or an intuition based on the use of IGS 100 of FIG. 1 is shown. At block 601, the sensing and switching module 131 of the prognosis platform 130 receives data from sensors and/or databases wherein the received data includes a significant change from the data previously transmitted by the sensors and/or databases.

As discussed above, the sensing and switching module 130 may aggregate one or more portions of the business application data and the big data received from the sensors and/or databases (referred to as "environmental data"). Subsequently, the sensing and switching module transmits the environmental data to an emergency detector 132 of the prognosis platform 130. At block 602, the emergency detector 132 analyzes at least a subset of the received environmental data to determine whether an emergency situation is occurring or is imminent. At block 603, upon determining that an emergency situation is occurring or is imminent (e.g., through the application of one or more rule sets to at least a subset of the environmental data), the emergency detector 132 generates a notification and transmits the notification to the sensing and switching module 130.

At block 604, the sensing and switching module (i) provides the notification and the environmental data to an intuition generator 141 of the logic platform 140 and (ii) provides the notification to the context-based refining engine 133. At block 605, the context-based refining engine obtains particularized environmental data based on the information in the notification. As discussed above, the context-based refining engine 133 may select one or more rule sets defining further actions to be taken by the context-based refining engine 133 according to the notification. For example, the type of emergency detected by the emergency detector 132 may result in the section of a predefined rule set that sets forth one or more preconfigured queries for the context-based refining engine 133. In one embodiment, the one or more preconfigured queries may be directed at focusing the collection of data from one or more of the sensor network 110A, the sensor database 110B, the business application database 111 and/or the big data database 112 according to the information in the notification. The particularized environmental data (and/or sensor data, if applicable), may be provided to the intuition generator 141 via the sensing and switching module 131.

At block 607, the intuition generator 141 generates an intuition based on one or more of the received environmental data, the received particularized environmental data and/or the notification ("received data"). As discussed above, the intuition generator 131 may apply one or more predefined rule sets to the received data to generate an intuition, which may be interpreted as a recommendation for one or more actions to take, or not take, based on an analysis of the received data. A recommendation may be a predefined course of action that is selected based on the comparison of the environmental data and/or the notification to one or more rule sets. In one embodiment, the result of a comparison of one or more portions of the environmental data to a rule set may determine the course of action. As discussed below, when one or more rule sets determine multiple courses of action, the courses of action may be ranked by priority (e.g., according to the course of action, the type of emergency, or rule set corresponding to the recommended course of action). Specifically, the intuition should be understood as being a transformation of data collected from a plurality of sensors and/or databases over a predetermined time frame to a concrete recommendation for a course of action based on an analysis and extrapolation of the collected and historical data through the use of one or more rule sets.

Finally, at block 608, the generated intuition is provided to a notification generator 152 of the presentation platform 150. The notification generator 152 generates a UI in order to present the generated intuition to one or more users 170. Additionally, the notification APIs 153 enable the notification generator 152 to generate UIs for a plurality of device types and the scheduler 151 allows the UI presenting the intuition to be provided to one or more users 170 at predetermined times.

Figure 7A:
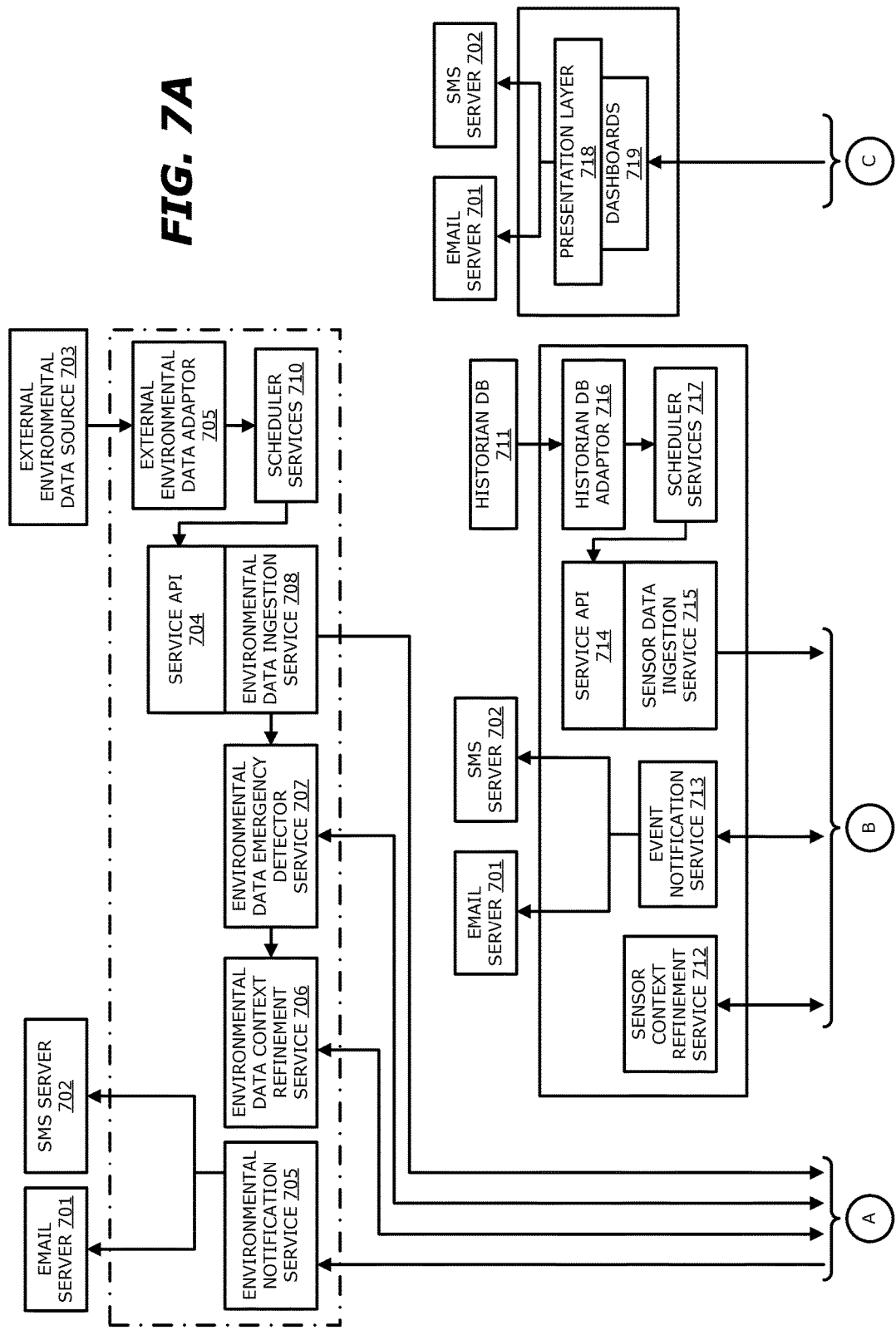
FIG. 7A is a first block diagram of a detailed sample architecture of the IGS 100.
Figure 7B:
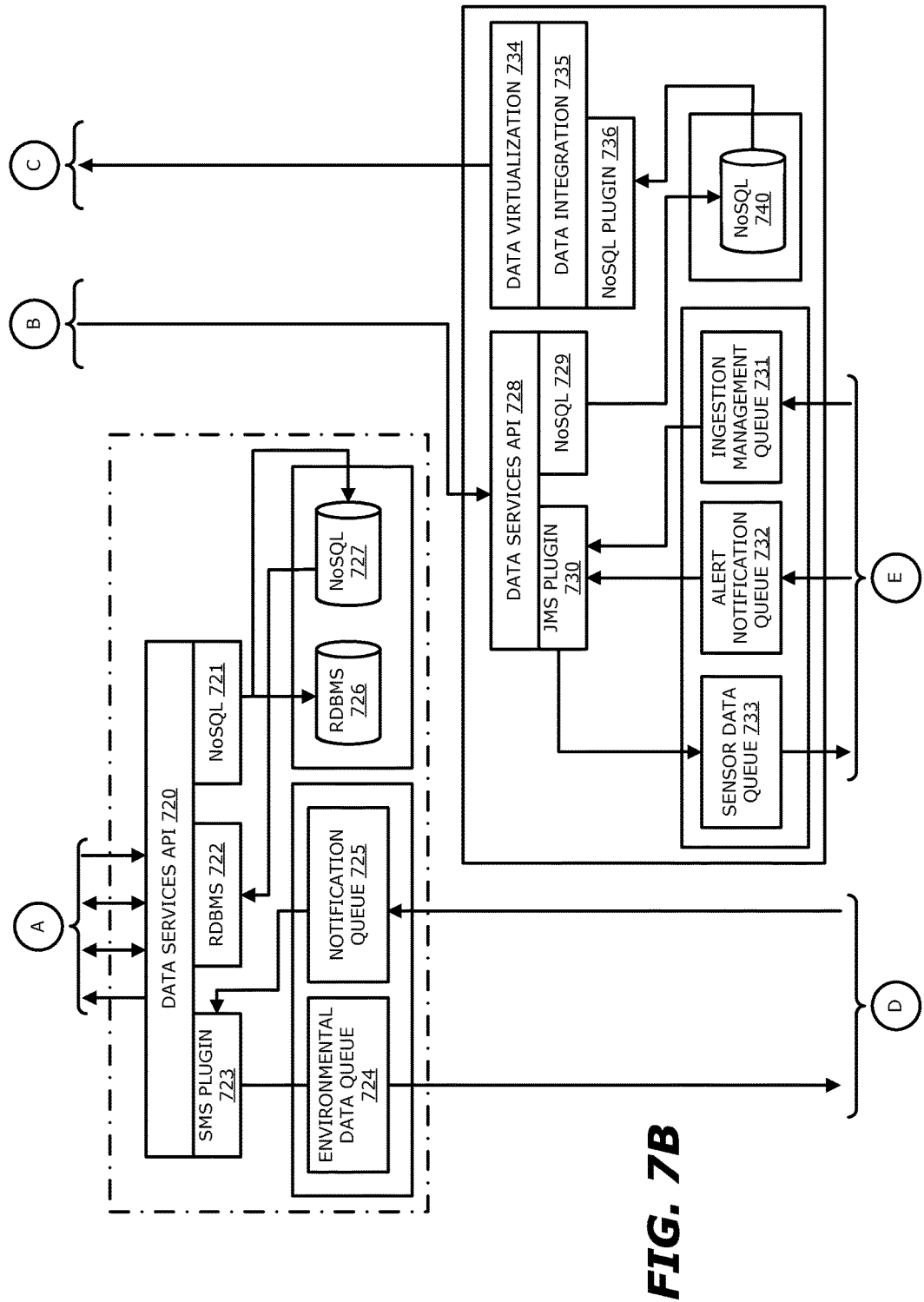
FIG. 7B is a second block diagram of a detailed sample architecture of the IGS 100.
Figure 7C:
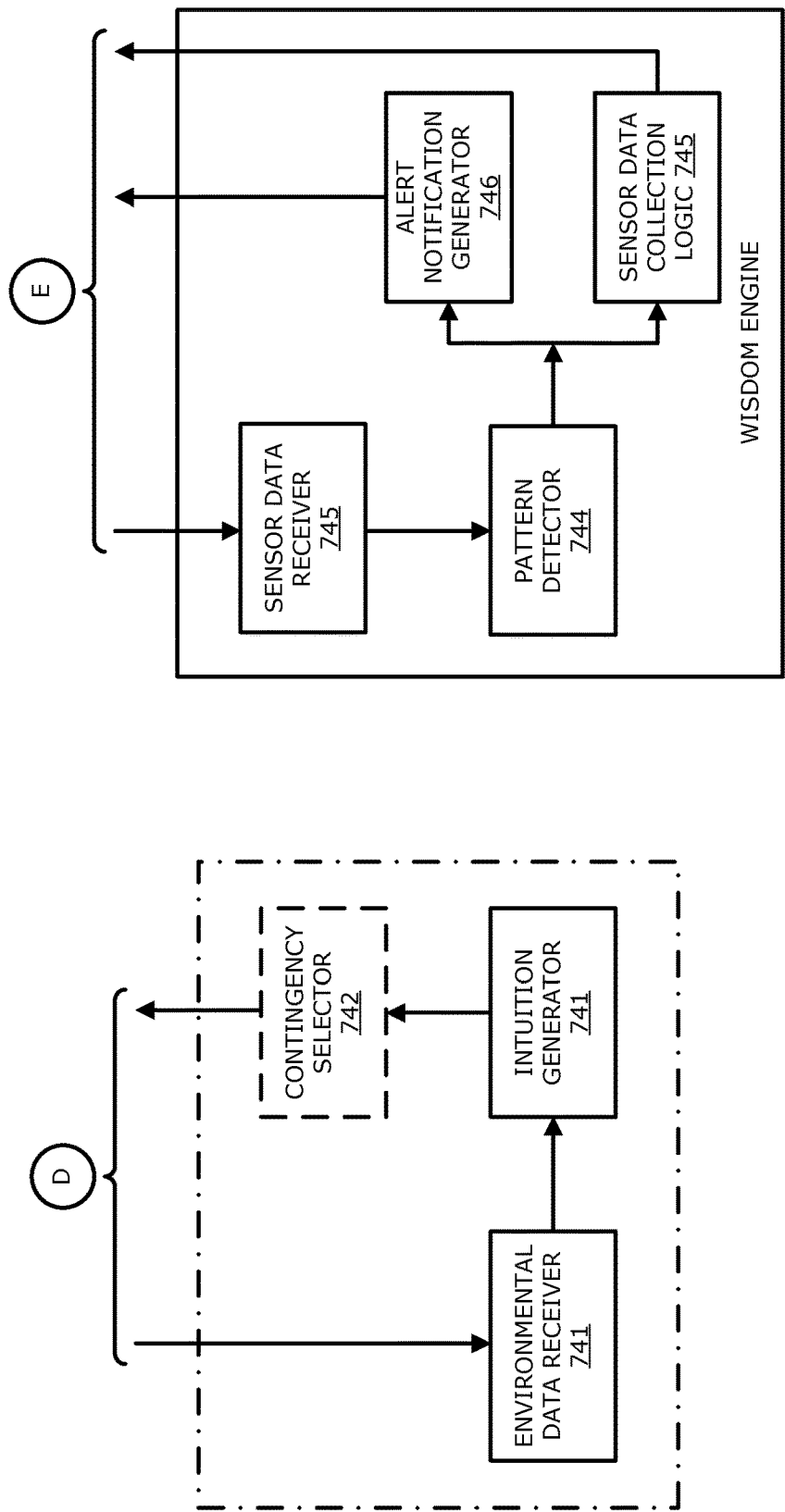
FIG. 7C is a third block diagram of a detailed sample architecture of the IGS 100.

In one embodiment, the predefined courses of action may be stored in the storage 161 and updated according to data received via the network 200. For example, as a pipeline is extended or a new method of transportation is added to an oil and gas company's ecosystem (e.g., all equipment, personnel and processes involved in the production of the company's product), a course of action may be added to the plurality of courses of action. Additionally, a course of action may be updated via data received over the network 200, or a course of action may be removed from the plurality of courses of action stored in the storage 161. Similarly, one or more rules may be updated in the same manner. The updated one or more rules may reflect an update to one or more courses of action or may alter, add to or remove from, existing rules Referring to FIGS. 7A-7C, a block diagram of a detailed sample architecture of the IGS 100 is shown. FIGS. 7A-7C create a continuous architecture diagram such that inputs from FIG. 7A may flow to FIG. 7B, inputs from FIG. 7B may flow to FIG. 7C, outputs from FIG. 7C may flow to FIG. 7B, and outputs from FIG. 7B may flow to FIG. 7A. Each block illustrated in FIGS. 7A-7C may represent a software, hardware or firmware component acting in coordination with a general purpose electronic device of the IGS 110. Additionally, peripheral components such as an email server and/or a data source may be included in FIGS. 7A-7C to provide reference as to the inputs and outputs of the IGS 110.

In particular, FIG. 7A illustrates a services platform that may include the presentation platform 150 as illustrated in FIG. 1. As illustrated in FIG. 7A, the components 704-710 illustrate components of the IGS 100 that handle the reception of environmental data (which, as discussed above, includes one or more portions of the business application data and/or the big data), the filtering of the environmental data, the context-refinement of the environmental data and the transmission of the filtered and context-refined environmental data to the environmental data queue 724, as illustrated in FIG. 7B. Specifically, external environmental data adaptor 709 receives environmental data from the external environmental data source 703 (e.g., the business application database 111 and/or the big data database 112). In one embodiment, the scheduler services 710 provides the received environmental data to the environmental data ingestion services 708 through the service API 704 according to predetermined time intervals. The service API 704 may present the environmental data to the environmental data ingestion services 708 in a singular format (e.g., in an extensible markup language (XML) file or a hypertext markup language (HTML) file) such that the environmental data ingestion services 708 may easily filter the received environmental data as the external environmental data source 703 may provide the environmental data to the external environmental data adaptor 709 in a plurality of formats due to the environmental data potentially being derived from a plurality of databases.

The environmental data ingestion service 708 may perform operations similar to the business application intelligence module 122 and/or the big data intelligence module 123 of FIG. 1 by determining whether the received environmental data includes a significant change from the environmental data previously transmitted from the environmental data ingestion service 708 to the environmental detector service 707 and the environmental data queue 724 (via the data services API 720). The environmental data emergency detector service 707 may perform operations similar to the emergency detector 132 by analyzing at least a subset of the environmental data to determine whether an emergency is occurring or is imminent based on one or more predefined rule sets.

Upon detecting an emergency, the environmental data emergency detector service 707 may generate a notification and provide the notification to the environmental data context refinement service 706. The notification may include the type of emergency detected, the one or more rules whose application triggered the detection of the emergency and/or one or more variables from the sensor network 110A and/or the sensor database 110B. The environmental data context refinement service 706 may perform similar operations as the context-based refining engine 133 and obtain particularized environmental data based on the notification generated by the environmental data emergency detector service 707 by applying one or more predefined rule sets to the environmental data.

Referring to FIG. 7B, data from one or more of the environmental data ingestion service 708, the environmental data emergency detector service 707 and/or the environmental data context refinement service 706 may be provided to the environmental data queue 724, and/or a NoSQL database 727 by way of the data services API 720. The data services API may utilize a short message service (SMS) plugin to pass the data to the environmental data queue and a NoSQL plugin, and data obtained from the RDMS 726, to pass the data to the NoSQL database 727.

Referring to FIG. 7C, the environmental data queue 704 passes the data stored therein to the intuition generator 141 by way of the environmental data receiver 741. Upon generating an intuition, as discussed above, the intuition generator 141 provides the intuition to the notification queue 725 of FIG. 7B. The intuition is then passed through the data services API 720 to the environmental notification service 705 of FIG. 7A. The environmental notification service 705 may provide the intuition to one or more users 170 via an email server 701 and/or a SMS server 702. As discussed above, a UI may be generated, in this embodiment by the environmental notification service 705, to present the intuition as a UI to one or more users 170.

Referring to FIG. 7A, the components 712-717 illustrate components of the IGS 100 that handle the reception of sensor data, the filtering of the sensor data, the context-refinement of the sensor data and the transmission of the filtered and context-refined sensor data to the sensor data queue 733, as illustrated in FIG. 7B. In one embodiment, a historian database 711 provides sensor data to a historian database adaptor 716 which, through the scheduler services 171 as predetermined time intervals, provides the sensor data to the service API 714. The service API 714 may present the sensor data to the sensor data ingestion services 715 in a singular format such that the sensor data ingestion services 715 may easily filter the received sensor data as the historian database 711 may provide the sensor data to the historian database adaptor 716 in a plurality of formats.

The sensor data ingestion service 715 may perform operations similar to the sensor intelligence module 121 of FIG. 1 by determining whether the received sensor data includes a significant change from the sensor data previously transmitted from the sensor data ingestion service 715 to the sensor data queue 733. As discussed above, the sensor data ingestion service 715 may determine whether a significant change exists based on comparing the change between the current sensor data and the most recently sensor data transferred to the sensor data queue 733 to one or more predetermined thresholds (e.g., based on the percentage of change of one or more variables).

Referring to FIG. 7B, sensor data may be provided to the sensor data queue 733 by way of the data services API 728 using, in one embodiment, a SMS plugin based on the type of queue comprising the sensor data queue 733. Additionally, the sensor data may be provided to a NoSQL database 740 and subsequently be passed on to the data integration 735 and data virtualization 734 components prior to being passed to the presentation platform 150 as illustrated in FIG. 7A.

Referring to FIG. 7C, the sensor data queue 715 passes the sensor data stored therein to the wisdom engine 144. In particular, the sensor data receiver 743 receives the sensor which is passed to the pattern detector 744. The pattern detector 744 may utilize one or more predefined rule sets, algorithms, functions and/or equations such as any linear or nonlinear functions, quadratic equations, trigonometric functions (e.g., sine and cosine), polynomial equations or the like in order to determine whether a pattern is present in the sensor data. The pattern detector 744 may analyze the current sensor data in light of previous sensor data similarly stored in the sensor data queue 715. The pattern detector 744 may provide results of the pattern detection to an alert notification generator and/or a sensor data collection logic 745. The combination of one or more of the outputs of the pattern detector 744, the alert notification generator 746 and the sensor data collection logic 745 may be referred to as an insight. The output of the alert notification generator 746 and the output of the sensor data collection logic 745 may be provided to the alert notification queue 732 and the ingestion management queue 731, respectively, as illustrated in FIG. 7B. The output of the alert notification generator 746 and the output of the sensor data collection logic 745 (cumulatively, an insight) may then be passed to event notification service 713 and the sensor context refinement service 712 using the data services API 728. The event notification service 713 may provide the insight to the email server 701 and/or the SMS server 702. As discussed above, a UI may be generated, in this embodiment by the event notification service 713, to present the insight as a UI to one or more users 170.

Figure 8:
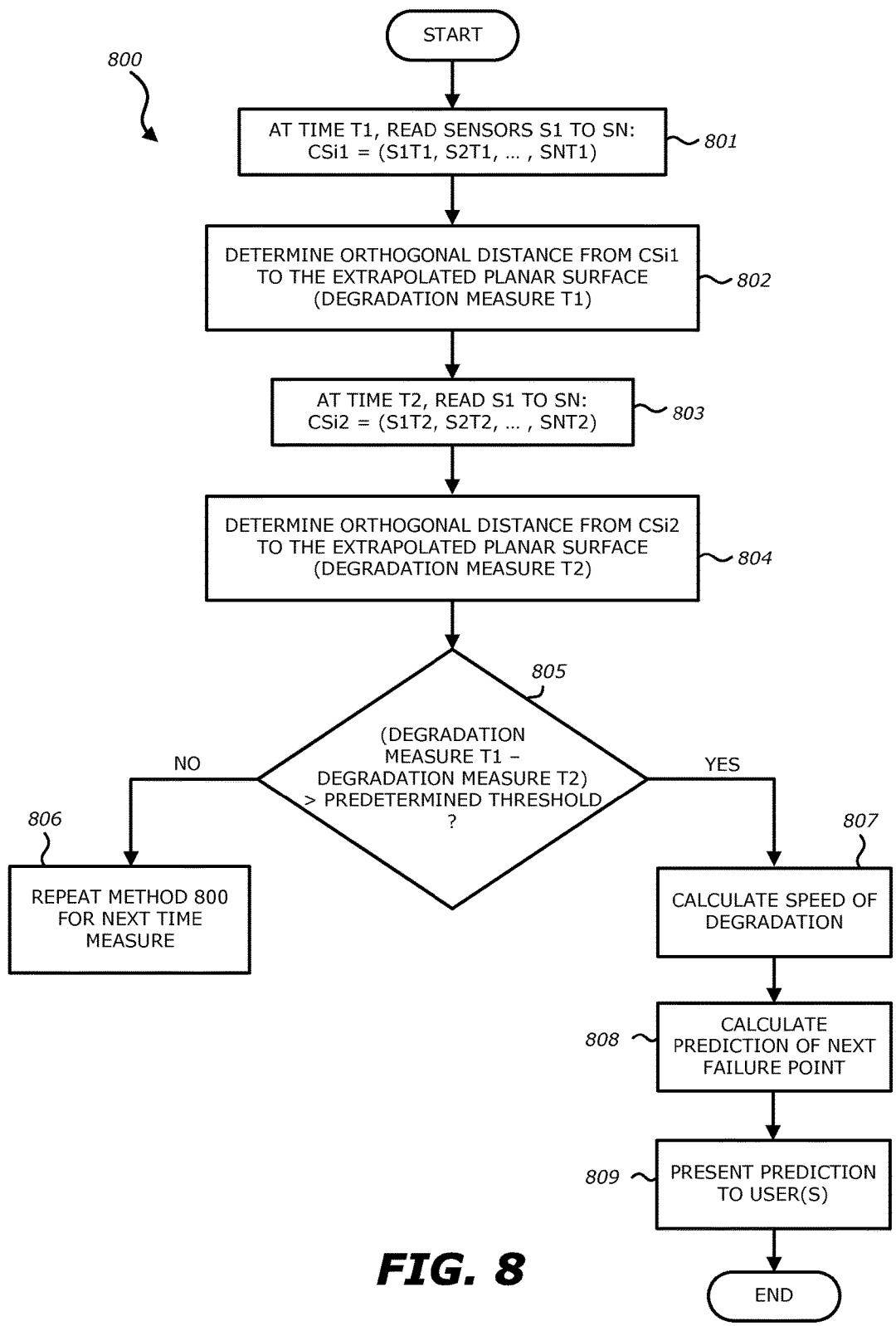
FIG. 8 is a flowchart of an exemplary process for predicting failure within a system by the wisdom engine 144 of the IGS 100 to generate an intuition.

Referring to FIG. 8, a flowchart of an exemplary process for predicting failure within a system by the wisdom engine 144 of the IGS 100 in order to generate an insight is shown. Each block illustrated in FIG. 8 represents an operation performed in the method 800 of predicting failure within a system is shown. The method 800 illustrates the process through which the wisdom engine 144 predicts a point of failure within a system (e.g., one or more pieces of equipment, wherein when the system includes two or more pieces of equipment, the two or more pieces may operate in a dependent manner or may operate in an independent manner). Upon predicting one or more failure points, the wisdom engine 144 may then generate an insight.

As an overview, each reading provided by a sensor of the sensor network 110A or the sensor database 110B at a particular time may be interpreted as a coordinate in a multidimensional space. For example, in an oil pipeline system, at a first time, four sensors (e.g., a thermometer, an intake pressure sensor, a vibration sensor, and a leakage current sensor) may provide a coordinate in multidimensional space corresponding to the reading of the four sensors: (e.g., 32° C., 200 lbs./sq. inch, 20 mm/sec., 0.2 amp). The orthogonal distance between this multidimensional coordinate and a multidimensional surface of previously known failure points (e.g., generated by surface, or curve, fitting techniques), may be determined. A second multidimensional coordinate may then be determined at a second time from the same four sensors. Upon determining the second multidimensional coordinate, the orthogonal distance between the second multidimensional coordinate and the multidimensional surface fitting of the previously known failure points may be determined. The orthogonal distances may then be compared to determine whether the orthogonal distance between the multidimensional coordinates is approaching the multidimensional surface fitting of the previously known failure points. The wisdom engine 144 may alert one or more users based upon the comparison of the orthogonal distances. Obviously, more or less than four sensors may be used.

Referring again to FIG. 6, at time T1, each of the sensors S1 to SN are read to determine a first coordinate point, CSi1, wherein CSi1=(S1T1, S2T1, . . . , SNT1) (block 801). At block 802, the wisdom engine 144 determines the orthogonal distance from CSi1 to an extrapolated multidimensional surface of previously known failure points (referred to hereinafter as the "degradation measure T1"). A failure point may be construed as a multidimensional coordinate corresponding to a point of failure of the system or equipment that was previously known, in other words, the sensor data when a failure previously occurred. Herein, the multidimensional surface fitting of previously known failure points may be done periodically by the wisdom engine 144 prior to the start of the method 800, the wisdom engine 144 may be initially configured with a multidimensional surface based on previously known failure points and/or the wisdom engine 144 may receive updates to the multidimensional surface based on new failure points from a network administrator, or the like, over the network 200.

At time T2, each of the sensors S1 to SN are read to determine a second coordinate point, CSi2, wherein CSi2=(S1T2, S2T2, . . . , SNT2) (block 803). At block 804, the wisdom engine 144 determines the orthogonal distance from CSi2 to the extrapolated multidimensional surface of the previously known failure points (referred to hereinafter as the "degradation measure T2"). At block 805, the wisdom engine 144 determines whether the difference between the degradation measure T1 and the degradation measure T2 is greater than a predetermined threshold, wherein the predetermined threshold may be dependent on the orthogonal distance of CSi1 to the extrapolated multidimensional surface of the previously known failure points. For example, the predetermined threshold used in block 805 may be a first value when a first orthogonal distance between CSi1 and the extrapolated multidimensional surface but would be a second, larger value orthogonal distance between CSi1 and the extrapolated multidimensional surface is a second value larger than the first value. In other words, in one embodiment, the closer CSi1 is to the extrapolated multidimensional surface, the smaller the predetermined threshold may be.

When the difference between the degradation measure T1 and the degradation measure T2 is not greater than a predetermined threshold (no at block 805), the method 800 starts again in order to compare the degradation measure T2 with a degradation measure T3 based on the readings of the sensor network 110A and/or the sensor database 110B at time T3, wherein time T3 is a time later than time T2.

When the difference between the degradation measure T1 and the degradation measure T2 is greater than a predetermined threshold (yes at block 805), the wisdom engine 144 calculates the speed of degradation (block 807). The speed of degradation is the change in degradation (difference between the degradation measure T1 and the degradation measure T2) divided by the time elapsed from T1 to T2. The speed of degradation is set forth in the equation below.

$$\text{Speed of degradation} = \frac{\text{degradation measure } T1 - \text{degradation measure } T2}{T2 - T1}$$

At block 808, the wisdom engine 144 calculates the prediction of the next failure point. Calculating the prediction of the next failure point is done by dividing the current degradation measure (e.g., the latest degradation measure, herein being the degradation measure T2) by the speed of degradation, which is set forth in the equation below.

$$\text{Prediction of next failure point} = \frac{\text{degradation measure } T2}{\text{speed of degradation}}$$

Upon calculating the prediction of the next failure point, the prediction is presented to the user(s) 170 (block 809). In addition to the prediction, the wisdom engine 144 may also present the user(s) 170 with the sensor data used in the prediction.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

What is claimed is:

1. A computing system comprising:
    a data receiver to receive data from a plurality of sources, the data including sensor data and environmental data, wherein the data receiver includes:
        a sensor module coupled to at least one of a sensor network of sensors and a sensor database providing sensor data;
        a business application module coupled to a business application database providing business data including public and private business data; and
        a big data module coupled to a big data database providing big data including weather data; and
    one or more processors coupled to the data storage and configured to process the sensor data and environmental data and to implement logic including:
        an emergency detector to receive environmental data and provide an emergency notification if an emergency situation is detected, the emergency notification including a type of emergency situation detected based on the received environmental data and one or more rule sets;
        a sensing and switching module to receive sensor data and environmental data and an emergency notification from the emergency detector, the sensing and switching module to transmit the emergency notification if an emergency situation is detected, to transmit at least sensor data if no emergency notification is received, and to provide one or more variables from the business application database or big data;
        a wisdom engine to receive at least the transmitted sensor data from the sensing and switching module when no emergency situation is detected and to provide an insight recommending one or more actions or no actions based on analysis of at least the transmitted sensor data and one or more rule sets, wherein the sensing and switching module is to transmit sensor data and environmental data to the wisdom engine in providing the insight to a user;
        a context-based refining engine to receive the transmitted emergency notification from the sensing and switching module and to forward queried environmental data based on the type of emergency detected;
        an intuition generator to receive the emergency notification and environmental data from the switching module and the forwarded queried environmental data from the context-based refining engine, the intuition generator to provide an intuition including a course of action based on analysis of the received emergency notification, environmental data, and queried environmental data and one or more rule sets; and
        a presentation module for providing the insight from the wisdom engine or intuition from the intuition generator to a user via a user interface (UI).

2. The computing system of claim 1, wherein the sensor module, business application module, and big data module filter respective sensor data, business data, and big data for updated changes.

3. The computing system of claim 1, wherein environmental data includes business data and big data.

4. The computing system of claim 1, wherein the one or more processors to implement logic further including:
    a compliance module to receive sensor data from the sensing and switching module to determine if one or more sensors providing sensor data meet compliance or regulatory requirements based on or more rule sets and to provide a compliance alert to wisdom engine or intuition generator if one or more sensors do not meet compliance or regulatory requirements.

5. The computing system of claim 1, wherein the presentation module provides the compliance alert to a user via the UI.

6. A computer-implemented method comprising:
    receiving data from a plurality of sources, the data including sensor data and environmental data, wherein receiving the data further includes:
        receiving sensor data from a sensor network of sensors and a sensor database;
        receiving business data from a business application database, the business data including public and private business data; and
        receiving big data from a big data database, the big data including weather data; and
    providing one or more variables from the business application database or big data wherein the one or more variables is used for providing an insight or intuition;
    transmitting sensor data and environmental data used in providing the insight to a user;
    detecting an emergency situation based on the received environmental data and one or more rule sets;
    providing an emergency notification including a type of emergency situation detected;
    transmitting the emergency notification if an emergency situation is detected and transmitting at least sensor data if no emergency situation is detected;
    receiving at least the transmitted sensor data when no emergency situation is detected and providing the insight recommending one or more actions or no actions based on analysis of at least the transmitted sensor data and one or more rule sets;
    querying environmental data if emergency notification is transmitted and forwarding queried environmental data;

receiving the emergency notification, environmental data, and forwarded queried environmental data and providing the intuition including a course of action based on analysis of the received emergency notification, environmental data, and queried environmental data and one or more rule sets; and presenting the insight from the wisdom engine or intuition from the intuition generator to a user via a user interface (UI).

7. The computer-implemented method of claim 6, further comprising:

filtering the sensor data, business data, and big data for updated changes.

8. The computer-implemented method of claim 6, further comprising:

receiving sensor data to determine if one or more sensors providing sensor data meet compliance or regulatory requirements based on or more rule sets;

providing a compliance alert to a user via a UI if one or more sensors do not meet compliance or regulatory requirements.

9. A non-transitory computer-readable medium containing instructions, which if executed by a computer, causes the computer to perform an operation comprising:

receiving data from a plurality of sources, the data including sensor data and environmental data, wherein receiving the data includes:

receiving sensor data from a sensor network of sensors and a sensor database;

receiving business data from a business application database, the business data including public and private business data; and receiving big data from a big data database, the big data including weather data; and providing one or more variables from the business application database or big data wherein the one or more variables is used for providing an insight or intuition;

transmitting sensor data and environmental data used in providing the insight to a user;

detecting an emergency situation based on the received environmental data and one or more rule sets;

providing an emergency notification including a type of emergency situation detected;

transmitting the emergency notification if an emergency situation is detected and transmitting at least sensor data if no emergency situation is detected;

receiving at least the transmitted sensor data when no emergency situation is detected and providing the insight recommending one or more actions or no actions based on analysis of at least the transmitted sensor data and one or more rule sets;

querying environmental data if emergency notification is transmitted and forwarding queried environmental data;

receiving the emergency notification, environmental data, and forwarded queried environmental data and providing the intuition including a course of action based on analysis of the received emergency notification, environmental data, and queried environmental data and one or more rule sets; and presenting the insight from the wisdom engine or intuition from the intuition generator to a user via a user interface (UI).

10. The non-transitory computer-readable medium of claim 9, wherein the computer further performs an operation comprising:

filtering the sensor data, business data, and big data for updated changes.

11. The non-transitory computer-readable medium of claim 9, wherein the computer further performs an operation comprising:

receiving sensor data to determine if one or more sensors providing sensor data meet compliance or regulatory requirements based on or more rule sets;

providing a compliance alert to a user via a UI if one or more sensors do not meet compliance or regulatory requirements.

\* \* \* \* \*